United States Patent Office 3,338,897
Patented Aug. 29, 1967

3,338,897
7-(α-SUBSTITUTED ACYL AMINO) CEPH-
ALOSPORANIC ACID AND DERIVA-
TIVES THEREOF
Tadayoshi Takano, Hirakata, Kiyoshi Hattori, Ibaragi,
and Masaru Kurita and Susumu Horibe, Osaka, Japan,
assignors to Fujisawa Pharmaceutical Co., Ltd., Osaka,
Japan, a company of Japan
No Drawing. Filed Mar. 10, 1965, Ser. No. 438,756
5 Claims. (Cl. 260—243)

This invention relates to 7-(α-substituted acylamino) cephalosporanic acid and derivatives thereof.

An object of this invention is to provide new compounds which are useful as the antimicrobial agents.

The compopunds of this invention may be represented by the following structural Formula I:

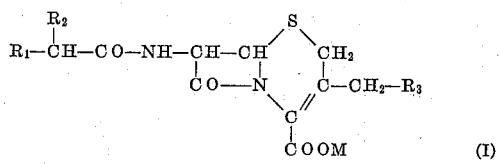

wherein $R_1$ is halogen, azido ($N_3$), carbamoyl, lower alkylthio, lower alkanoyl, lower alkanoyloxy, lower alkoxy-lower alkoxy, lower alkyoxyaralkyl, naphthoxy, halonaphthoxy, arylthio, haloarylthio, or phenoxy having lower alkenyl and lower alkoxy; $R_2$ is aryl, aryl having halogen or nitro, aryloxy or arylthio; $R_3$ is acetoxy, pyridinium, imidazolinium or methylimidazolium; and M is hydrogen, a pharmaceutically acceptable non-toxic cation or an anionic charge.

In the above formula, lower alkanoyl of $R_3$ includes acetyl, propionyl, butyloyl etc., aryl of $R_2$ includes phenyl, naphthyl, tolyl, etc., and further, a pharmaceutically acceptable non-toxic cation of M includes, for example, the alkali metal ion such as sodium ion or potassium ion, the ammonium radical and the organic ammonium cation such as triethylammonium, dicyclohexylammonium, diphenylenediammonium or dibenzylethylenediammonium.

The compound (I) of this invention may be prepared by reacting 7-aminocephalosporanic acid or its derivatives having the Formula II:

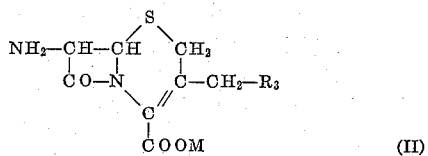

with α-substituted carboxylic acid having the Formula III:

or its reactive derivative, wherein $R_1$, $R_2$, $R_3$ and M are the same as those described in Formula I.

7 - aminocephalosporanic acid (7 - amino - 3 - acetoxymethyl-3-cephem-4-carboxylic acid) in the starting material (II) is known compound in the art and can be obtained upon hydrolysis of antibiotic cephalosporan C [Biochemical Journal 79, 408–416 (1961)].

When using α-substituted carboxylic acid, the reaction is preferably carried out in the presence of the condensing agent such as dicyclohexylcarbodiimide, N-cyclohexyl - N' - morpholinoethyl - carbodiimide, pentamethyleneketen - N-cyclohexylimine, N-ethyl-o-phenylisoxazolium-3'-sulfonate, phosphorus trichloride and so forth. In this case, it is considered that the reaction may mainly proceed through an active form of carboxyl radical in α-substituted carboxylic acid or of amino radical in 7-aminocephalosporanic acid.

In reactive derivatives of α-substituted carboxylic acid may be mentioned the acid halide, acid anhydride, acid amide, acid ester and so forth. Examples of the reactive derivatives of α-substituted carboxylic acid to be frequently used are the acid chloride, acid azide, mixed acid anhydride with alkylphosphoric acid or alkylcarbonic acid, acid amide with imidazole or 4-substituted imidazole, acid cyanomethyl ester, acid p-nitrophenyl ester and so forth. These reactive derivatives are suitably selected in accordance with the kinds of α-substituted carboxylic acid to be used.

The reaction is usually carried out in the presence of a solvent. In the solvent may be mentioned acetone, dioxane, acetonitril, chloroform, ethylene chloride, tetrahydrofuran, or another organic solvent which are inert in the reaction and are used commonly. Of these solvents, the hydrophylic ones may be used with water.

Also, the reaction may be carried out in the presence of a base such as alkali metal hydrogen carbonate, trialkylamine, pyridine, etc. The reaction is carried out in most cases under cooling or at room temperature though the temperature is not particularly limited.

After completing the reaction, the reaction product is separated according to the conventional method known in the arts.

When using the compound (II) wherein M is a pharmaceutically acceptable non-toxic cation as a starting compound, the object compound (I) wherein M is hydrogen is mainly obtained, because the dissociation of the cation tends to occur during the separation of the reaction product. Therefore, if it desired to obtain the object compound (I) wherein M is a pharmaceutically acceptable non-toxic cation, the compound (I) wherein M is hydrogen is treated with an appropriate compound such as sodium hydroxide, potassium hydroxide, sodium α-ethylhexanoate, triethylamine, dicyclohexylamine, diphenylenediamine or dibenzylethylenediaminne.

In addition, the compoud (I) wherein $R_3$ is pryidinium, aminopyridinium, imidazolinium or methylimidazolinium may be obtained by reacting the compound (II) wherein $R_3$ is acetoxy, with pyridine, aminopryidine, imidazole or methylimidazole.

Both 7-aminocephalosporanic acid or its derivatives (II) to be used in the reaction of this invention and the object compound (I) are comparatively unstable and tend to decompose during treatment. Therefore, it is preferable to carry out the reaction and separation under mild condition.

Thus obtained compound (I) not only demonstrates resistance to penicillinase but exhibits advantageous physiological properties and activity against a wide variety of micro-organisms.

The following examples will illustrate the types of compounds available in accordance with this invention.

In the examples, "MIC" means a minimum inhibitory concentration which is measured by the serial dilution method commonly employed in testing antimicrobial compounds, and *Escherichia coli* and *Staphylococcus aureus* are referred to "E. coli" and "St. aureus," respectively.

EXAMPLE 1

7-(2-chloro-2-phenylacetamido) cephalosporanic acid

To the solution of 540 mg. of 7-aminocephalosporanic acid and 200 mg. of sodium bicarbonate in 20 cc. of acetone, was added 390 mg. of 2-chloro-2-phenylacetyl chloride in 5 cc. of acetone under ice-cooling. This solution was stirred for an hour under ice-cooling and then for 3 hours at room temperature and allowed to stand overnight. After adjusting to pH 2.0, the reaction mixture was condensed under reduced pressure to obtain the precipitate, which was collected by filtration. Thus obtained precipitate was washed with ether and dissolved into acetone to obtain 550 mg. of 7-(2-chloro-2-phenylacetamido) cephalosporanic acid as crystals having M.P. 92°–94° C.

*Analysis.*—Calculated for $C_{18}H_{17}O_6H_2SCl$: C, 48.81; H, 4.29. Found: C, 48.92; H, 4.31.

UV: $\lambda_{max.}^{80\% \; C_2H_5OH}$ 263.5 m$\mu$, E 175.5.

MIC: *E. coli* >10 $\gamma$/cc., *St. aureus* 0.25 $\gamma$/cc.

EXAMPLE 2

*7-(2-bromo-2-phenylacetamido) cephalosporanic acid*

2-bromo-2-phenylacetyl chloride prepared from 500 mg. of 2-bromo-2-phenylacetic acid and thionyl chloride, was dissolved into 5 cc. of chloroform. This solution was added to 540 mg. of 7-aminocephalosporanic acid in 25 cc. of chloroform and 0.6 cc. of triethylamine under ice-cooling and stirred for an hour. The reaction mixture was adjusted to pH 2.0 with water and hydrochloric acid, and the produced precipitate was filtered off. The filtrate was condensed under reduced pressure and after washing with ligroin, dissolved into acetone, to which was further added water to obtain 146 mg. of 7-(2-bromo-2-phenylacetamido) cephalosporanic acid as crystals having M.P. 141°–142° C.

MIC: *E. coli* >10 $\gamma$/cc., *St. aureus* 0.5 $\gamma$/cc.

EXAMPLE 3

*7-[2-chloro-2-(p-chlorophenyl) acetamido] cephalosporanic acid*

To the chloroform solution of 600 mg. of 7-aminocephalosporanic acid and 0.6 cc. of triethylamine, was added 450 mg. of 2-chloro-2-(p-chlorophenyl) acetylchloride under ice-cooling and stirred for 3 hours under ice-cooling. The reaction mixture was adjusted to pH 2.0 with water and hydrochloric acid and extracted with chloroform. The extract solution was condensed under reduced pressure and to thus obtained remainder was added aqueous sodium bicarbonate solution. The water layer was adjusted to pH 2.0 with hydrochloric acid and treated with ether. Thus produced precipitate was 7-[2-chloro-2-(p-chlorophenyl) acetamido] cephalosporanic acid having M.P. 104°–108° C. Furthermore, the identical substance was obtained by condensation of the ether extract solution. Total yield was 150 mg.

UV: $\lambda_{inf.}^{80\% \; C_2H_5OH}$ 264 m$\mu$, E 95.

PPC: Rf 0.77 (butanol:ethanol:water=4:1:5 by upper layer, ascending method).
Rf 0.97 (butanol:pyridine:water=1:1:1 by ascending method).

MIC: *E. coli* >40 $\gamma$/cc., *St. aureus* 0.25 $\gamma$/cc.

EXAMPLE 4

*7-[2-chloro-2-(p-bromophenyl) acetamido] cephalosporanic acid*

To the chloroform solution of 540 mg. of 7-aminocephalosporanic acid and 0.6 cc. of triethylamine, was added 540 mg. of 2-chloro-2-(p-bromophenyl) acetyl chloride under ice-cooling and stirred for 4 hours under ice-cooling. After adjusting to pH 2.0 with water and hydrochloric acid, the reaction mixture was condensed under reduced pressure. The remainder was washed with ether and dissolved into the sodium bicarbonate solution. This solution was further adjusted to pH 4.0 and the produced precipitate was reprecipitated from the mixture of acetone and water to obtain 232 mg. of 7-[2-chloro-2-(p-bromophenyl) acetamido] cephalosporanic acid as hygroscopic powders having M.P. 127°–130° C. (dec.).

UV: $\lambda_{max.}^{80\% \; C_2H_5OH \cdot NaOH}$ 262 m$\mu$, E 112.

PPC: Rf 0.77 (butanol:ethanol:water=4:1:5 by upper layer, ascending method).
Rf 0.80 (butanol:pyridine:water=1:1:1 by ascending method).

MIC: *E. coli* >40 $\gamma$/cc., *St. aureus* 0.25 $\gamma$/cc.

EXAMPLE 5

*7-[2-bromo-2-(p-chlorophenyl) acetamido] cephalosporanic acid*

To 838 mg. of 2-bromo-2-(p-chlorophenyl) acetyl chloride dissolved into 10 cc. of chloroform, was added 820 mg. of 7-aminocephalosporanic acid in 0.8 cc. of triethylamine and 25 cc. of chloroform and stirred for 30 minutes under ice-cooling and then for 1.5 hours at room temperature, after which was allowed to stand overnight in a cold place. The reaction mixture was adjusted to pH 1.0 with hydrochloric acid and the chloroform layer separated out was condensed under reduced pressure. The remainder was washed with ether to obtain 612 mg. of 7-[2-bromo-2-(p-chlorophenyl) acetamido] cephalosporanic acid as powders, M.P. 85°–92° C. (dec.).

MIC: *E. coli* >40 $\gamma$/cc., *St. aureus* 1 $\gamma$/cc.

EXAMPLE 6

*7-[2-chloro-2-(p-nitrophenyl) acetamido] cephalosporanic acid*

The solution of 680 mg. of 7-aminocephalosporanic acid and 600 mg. of 2-chloro-2-(p-nitrophenyl) acetylchloride in 1.2 cc. of triethylamine and 25 cc. of chloroform was stirred for 5 hours under ice-cooling. The reaction mixture was adjusted to pH 2.0 with hydrochloric acid and thus produced precipitate was separated out from the chloroform layer. The precipitate was extracted with acetone and, after condensing the extract solvent, the remainder was washed with ether to obtain 412 mg. of 7-[2-chloro-2-(p-nitrophenyl) acetamido] cephalosporanic acid as hygroscopic powders having M.P. 60°–63° C. (dec.). (From the remainder in acetone extraction, 7-aminocephalosporanic acid of the starting material was recovered.) Furthermore, 320 mg. of the object compound was obtained by condensing the chloroform layer and then washing the remainder with petroleum ether.

MIC: *E. coli* >40 $\gamma$/cc., *St. aureus* 2.5 $\gamma$/cc.

EXAMPLE 7

*7-[2-bromo-2-(1-naphthyl) acetamido] cephalosporanic acid*

7-aminocephalosporanic acid (680 mg.) and 1.18 g. of 2-bromo-2-(1-naphthyl) acetyl chloride were dissolved into 1.3 cc. of triethylamine and 25 cc. of chloroform and stirred for an hour under ice-cooling. The reaction mixture was adjusted to pH 2.0 with hydrochloric acid and thus produced precipitate was filtered off. From the filtrate the solvent was distilled off under reduced pressure and the remainder washed with ether to obtain 625 mg. of 7-[2-bromo-2-(1-naphthyl) acetamido] cephalosporanic acid as powders having M.P. 115°–125° C. (dec.).

UV: $\lambda_{max.}^{80\% \; C_2H_5OH}$ 227 m$\mu$, E 757; 295 m$\mu$, E 158.

MIC: *E. coli* >40 $\gamma$/cc., *St. aureus* 2.5 $\gamma$/cc.

EXAMPLE 8

*7-(2-azido-2-phenylacetamido) cephalosporanic acid*

2-azido-2-phenylacetic acid (450 mg.) and 1.1 cc. of thionyl chloride were stirred for 2 hours at 60° C. and the excess of thionyl chloride was distilled off to obtain 2-azido-2-phenylacetyl chloride, which was dissolved into 5 cc. of acetone. 7-aminocephalosporanic acid (1.088 g.) and 300 mg. of sodium bicarbonate in 15 cc. of acetone and 15 cc. of water were cooled to 0–5° C., to which solution was added drop by drop the acetone solution of 2-azido-2-phenylacetyl chloride above prepared in about 15 minutes. The reaction mixture was stirred for 30 minutes at 0–5° C. and then for an hour at room temperature and allowed to stand overnight. The reaction mixture was washed with ether and, after adjusting to pH 1.0 with N-hydrochloric acid, extracted with ethyl acetate. The solvent was distilled off under reduced pressure and to the remaining oily substance was added petroleum ether to obtain 734 mg. of 7-(2-azido-2-phenylacetamido) cephalosporanic acid as powders having M.P. 76°–78° C. (dec.).

UV: $\lambda_{\text{inf.}}^{80\% \ C_2H_5OH \cdot NaOH}$ 260 m$\mu$, E 153.

MIC: $E.\ coli$ >10 $\gamma$/cc., $St.\ aureus$ 1 $\gamma$/cc.

EXAMPLE 9

7-[2-azido-2-(p-chlorophenyl) acetamido] cephalosporanic acid 2-azido-2-(p-chlorophenyl) acetic acid (555 mg.) and 2 cc. of thionyl chloride were stirred for 2 hours at 60° C. and the excess of thionyl chloride was distilled off to obtain 2-azido-2-(p-chlorophenyl) acetyl chloride, which was dissolved into 5 cc. of acetone. 7-aminocephalosporanic acid (682 mg.) and 220 mg. of sodium bicarbonate in 10 cc. of acetone and 10 cc. of water were cooled to 0–5° C., to which solution was added the acetone solution of 2-azido-2-(p-chlorophenyl) acetyl chloride in about 15 minutes. The reaction mixture was stirred for 30 minutes at 0–5° C. and then for 2 hours at room temperature, after which was washed with ether. The water layer was adjusted to pH 1.0 with 5% hydrochloric acid and extracted with ethyl acetate. The solvent was distilled off under reduced pressure and the remainder was dissolved into acetone, which was distilled off. To the remaining oily substance was added ether to obtain 132 mg. of 7-[2-azido-2-(p-chlorophenyl) acetamido] cephalosporanic acid as powders having M.P. 200° C. (dec.).

UV: $\lambda_{\text{min.}}^{80\% \ C_2H_5OH \cdot NaOH}$ the longest wave-length.

MIC: $E.\ coli$ >40 $\gamma$/cc., $St.\ aureus$ 0.5 $\gamma$/cc.

EXAMPLE 10

7-[2-azido-2-(p-nitrophenyl) acetamido] cephalosporanic acid 2-azido-2-(p-nitrophenyl) acetic acid (555 mg.) and 1.1 cc. of thionyl chloride were stirred for 2 hours at 60° C. and the excess of thionyl chloride was distilled off to obtain 2-azido-2-(p-nitrophenyl) acetyl chloride, which was dissolved into acetone. 7-aminocephosporanic acid (682 mg.) and 220 mg. of sodium bicarbonate in 15 cc. of acetone and 15 cc. of water were cooled to 0–5° C., to which solution was added drop by drop the acetone solution of 2-azido-2-(p-nitrophenyl) acetyl chloride above prepared in about 15 minutes. The reaction mixture was stirred for 30 minutes at 0–5° C. and allowed to stand for one day. The reaction mixture was washed with ether and, after adjusting the water layer at pH 2.0 with 5% hydrochloric acid, extracted with ethyl acetate. The solvent was distilled off under reduced pressure and to the remaining oily substance was added petroleum ether to obtain 331 mg. of 7-[2-azido-2-(p-nitrophenyl) acetamido] cephalosporanic acid as powders having M.P. 175°–180° C. (dec.). (From the mother liquor, 207 mg. of 7-aminocephalosporanic acid was recovered.)

UV: $\lambda_{\text{max.}}^{80\% \ C_2H_5OH \cdot NaOH}$ 272 m$\mu$, E 276.

EXAMPLE 11

7-(2-acetoxy-2-phenylacetamido) cephalosporanic acid

To the solution of 540 mg. of 7-aminocephalosporanic acid and 300 mg. of triethylamine in 30 cc. of chloroform, was added 425 mg. of 2-acetoxy-2-phenylacetyl chloride in 5 cc. of chloroform under ice-cooling. This solution was stirred for 2 hours under ice-cooling and then for 4 hours at room temperature and allowed to stand overnight. The reaction mixture was filtered, after which to the filtrate was added dil. sulfuric acid and extracted with chloroform. The extract solution was condensed under reduced pressure, and the remainder was washed with ether and dissolved into acetone. To this acetone solution was added ether and allowed to stand to obtain 250 mg. of 7-(2-acetoxy-2-phenylacetamido) cephalosporanic acid as hygroscopic powders having M.P. 92°–96° C.

UV: $\lambda_{\text{max.}}^{80\% \ C_2H_5OH \cdot NaOH}$ 231.5 m$\mu$, E 358; 260 m$\mu$, E 118.

PPC: Rf 0.72 (butanol:ethanol:water=4:1:5 by upper layer, ascending method).

Rf 0.79 (butanol:pyridine:water=1:1:1 by ascending method).

MIC: $E.\ coli$ >20 $\gamma$/cc., $St.\ aureus$ 5 $\gamma$/cc.

EXAMPLE 12

7-(2-methylthio-2-phenylacetamido) cephalosporanic acid

To 327 mg. of 2-methylthio-2-phenylacetic acid in 5 cc. of tetrahydrofuran was added 400 mg. of dicyclohexylcarbodiimide in 2 cc. of tetrahydrofuran and stirred for 15 minutes at room temperature. To this solution was added the chloroform solution containing 500 mg. of 7-aminocephalosporanic acid and 0.25 cc. of triethylamine and after stirring for 3 hours at room temperature, allowed to stand overnight. To the reaction mixture was added water to precipitate the decomposed product of dicyclohexylcarbodiimide which was removed by filtration. The water layer was adjusted to pH 1.0 with 5% hydrochloric acid and extracted with ethyl acetate. The solvent was distilled off under reduced pressure and to the remainder was added petroleum ether to obtain 416 mg. of 7-(2-methylthio-2-phenylacetamido) cephalosporanic acid as powders having M.P. 78°–84° C. (dec.).

UV: $\lambda_{\text{max.}}^{80\% \ C_2H_5OH}$ 262 m$\mu$, E 164.

MIC: $E.\ coli$ >20 $\gamma$/cc., $St.\ aureus$ 1 $\gamma$/cc.

EXAMPLE 13

7-(2-acetyl-2-phenylacetamido) cephalosporanic acid

To 320 mg. of 2-acetyl-2-phenylacetic acid in 15 cc. of tetrahydrofuran was added 370 mg. of dicyclohexylcarbodiimide in 1.7 cc. of tetrahydrofuran and stirred for 20 minutes at room temperature. To this solution was added 10 cc. of aqueous solution containing 500 mg. of 7-aminocephalosporanic acid and 152 mg. of sodium bicarbonate and allowed to stand overnight. The reaction mixture was filtered and tetrahydrofuran was distilled off under reduced pressure. The remainder was dissolved into water and, after adjusting to pH 1.0 with 5% hydrochloric acid, extracted with ethyl acetate. The extract solution was condensed under reduced presure and the remainder was washed with ether to obtain 10 mg. of 7-(2-acetyl-2-phenylacetamido) cephalosporanic acid as powders having M.P. 180°–210° C. (dec.).

UV: $\lambda_{\text{max.}}^{80\% \ C_2H_5OH}$ 260 m$\mu$, E 213.

MIC: $E.\ coli$ >40 $\gamma$/cc., $St.\ aureus$ 20 $\gamma$/cc.

EXAMPLE 14

7-(2-propylthio-2-phenylacetamido) cephalosporanic acid

To 387 mg. of 2-propylthio-2-phenylacetic acid dissolved into 10 cc. of tetrahydrofuran was added 400 mg. of dicyclohexylcarbodiimide in 2 cc. of tetrahydrofuran and stirred for 15 minutes at room temperature. To this solution was added 10 cc. of the aqueous solution containing 500 mg. of 7-aminocephalosporanic acid and 150 mg. of sodium bicarbonate and, after stirring for 3.5 hours at room temperature, allowed to stand overnight. The reaction mixture was filtered and tetrahydrofuran was distilled off from the filtrate under reduced pressure. The remainder from which an oily substance was removed by decantation, was adjusted to pH 1.0 with hydrochloric acid and extracted with 500 cc. of ethyl acetate twice. Ethyl acetate was distilled off from the extract solution under reduced pressure and the remainder was dissolved into acetone, after which acetone was distilled off. To the remainder was added petroleum ether to obtain 266 mg. of 7-(2-propylthio-2-phenylacetamido) cephalosporanic acid as powders having M.P. 68°–70° C.

UV: $\lambda_{max.}^{80\% \ C_2H_5OH \cdot NaOH}$ 262 m$\mu$, E 180.

MIC: $E. \ coli$ >40 $\gamma$/cc., $St. \ aureus$ 0.5 $\gamma$/cc.

EXAMPLE 15

*7-[2-phenyl-2-(o-bromophenylthio) acetamido] cephalosporanic acid*

2-phenyl-2-(o-bromophenylthio) acetic acid (650 mg.) and 230 mg. of dicyclohexylcarbodiimide were dissolved into 20 cc. of tetrahydrofuran and stirred. To this solution was added drop by drop 540 mg. of 7-aminocephalosporanic acid and 180 mg. of sodium bicarbonate in 10 cc. of tetrahydrofuran and 15 cc. of water and after stirring for 5 hours at room temperature, allowed to stand overnight. The reaction mixture was filtered off and to the filtrate was added water. This solution was adjusted to pH 7.0 with sodium bicarbonate solution and filtered. To the filtrate was added ethyl acetate and adjusted to pH 3.5 with hydrochloric acid, after which the water layer separated out was adjusted to pH 1.0 with hydrochloric acid and extracted with ethyl acetate. From the extract solution ethyl acetate was distilled off under reduced pressure and thus obtained remainder was washed with ether to obtain 17 mg. of 7-[2-phenyl-2-(o-bromophenylthio) acetamido] cephalosporanic acid as powders having M.P. 164°–167° C. (dec.).

UV: $\lambda_{max.}^{80\% \ C_2H_5OH \cdot NaOH}$ 257 m$\mu$, E 218.

MIC: $E. \ coli$ >40 $\gamma$/cc., $St. \ aureus$ 5 $\gamma$/cc.

EXAMPLE 16

*7-[2-phenyl-2-(1-bromo-2-naphthoxy) acetamido] cephalosporanic acid*

To 680 mg. of 7-aminocephalosporanic acid in 0.7 cc. of triethylamine and 30 cc. of chloroform, was added 2-phenyl-2-(1-bromo-2-naphthoxy)acetylchloride prepared from 1078 mg. of 2-phenyl-2-(1-bromo-2-naphthoxy) acetic acid and stirred for 30 minutes under ice-cooling and then for 2 hours at room temperature. The reaction mixture was adjusted to pH 1.0 and the chloroform layer separated out was condensed under reduced pressure. Thus obtained remainder was washed with ether to produce 1.452 g. of powders. These powders was refined with the mixture of acetone and ether to obtain 1.17 g. of 7-[2-phenyl-2-(1-bromo-2-naphthoxy) acetamido] cephalosporanic acid as powders M.P. 85°–89° C. (dec.).

UV: $\lambda_{max.}^{80\% \ C_2H_5OH \cdot NaOH}$ 224.5 m$\mu$, E 365.

MIC: $E. \ coli$ >40 $\gamma$/cc., $St. \ aureus$ 0.25 $\gamma$/cc.

EXAMPLE 17

*7-(2-phenyl-3-aminomalonamido) cephalosporanic acid*

To 322 mg. of 2-phenylmalonamic acid in 15 cc. of acetone and 0.3 cc. of triethylamine was added 0.17 cc. of ethyl chloroformate at 0–5° C. and stirred for 15 minutes. To this solution cooled at −30°—−40° C., was added drop by drop 500 mg. of 7-amino-cephalosporanic acid in 16 cc. of 3% sodium bicarbonate solution in a minute, after the end of which was stirred for 30 minutes at 0–5° C. and then for 2 hours at room temperature. After washing with 50 cc. of ether twice, the reaction mixture was adjusted pH 1.0 with 5% hydrochloric acid and extracted with 50 cc. of ethyl acetate twice. Ethyl acetate was distilled off under reduced pressure and the remainder dissolved into acetone and then filtered. From the filtrate, acetone was distilled off and thus obtained remainder was washed with petroleum ether to obtain 7-(2-phenyl-3-aminomalonamido) cephalosporanic acid as faint yellow hygroscopic powders having M.P. 60°–65° C. (dec.).

UV: $\lambda_{max.}^{80\% \ C_2H_5OH \cdot NaOH}$ 260 m$\mu$, E 102.

MIC: $E. \ coli$ >40 $\gamma$/cc., $St. \ aureus$ 1 $\gamma$/cc.

EXAMPLE 18

*7-(2-phenoxy-3-aminomalonamido) cephalosporanic acid*

2-phenoxymalonamic acid (400 mg.) was dissolved into 0.2 cc. of tetrahydrofuran solution of dicyclocarbodiimide (0.2 g./cc.) and tetrahydrofuran and stirred for 20 minutes at room temperature. To this solution was added 500 mg. of 7-aminocephalosporanic acid and 160 mg. of sodium bicarbonate in 10 cc. of tetrahydrofuran and 10 cc. of water and stirred for 4 hours at room temperature. To this solution was further added 2 cc. of dicyclohexylcarbodiimide and allowed to stand overnight. The reaction mixture was filtered and from the filtrate, tetrahydrofuran was distilled off. The remaining solution was adjusted to pH 7.2 with sodium bicarbonate and then filtered. Thus obtained remainder was adjusted to pH 2.0 with hydrochloric acid and extracted with ethyl acetate. The remainder obtained by distillation of ethyl acetate was dissolved into acetone and filtered. From the filtrate, acetone was distilled off and the remainder was washed with ether to obtain 109 mg. of 7-(2-phenoxy-3-amino-malonamido) cephalosporanic acid as powders having M.P. 100°–110° C. (dec.).

UV: $\lambda_{max.}^{80\% \ C_2H_5OH \cdot NaOH}$ 269 m$\mu$, E 158.8.

MIC: $E. \ coli$ >40 $\gamma$/cc., $St. \ aureus$ 5 $\gamma$/cc.

EXAMPLE 19

*7-[2-phenyl-2-(2-naphthoxy) acetamido] cephalosporanic acid*

2-phenyl-2-(2-naphthoxy) acetyl chloride prepared from 695 mg. of 2-phenyl-2-(2-naphthoxy) acetoxy acid and thionyl chloride, 680 mg. of 7-aminocephalosporanic acid and 20 mg. of sodium bicarbonate were dissolved into 30 cc. of 50% acetone and stirred for 3 hours under ice-cooling. The reaction mixture was, after washing with ether, adjusted to pH 2.0 with hydrochloric acid and extracted with ethyl acetate. From the extract solution, ethyl acetate was distilled off and thus obtained remainder was washed with petroleum ether to obtain 674 mg. of 7-[2-phenyl-2-(2-naphthoxy) acetamido] cephalosporanic acid as powders having M.P. 85°–100° C. (dec.).

UV: $\lambda_{max.}^{80\% \ C_2H_5OH \cdot NaOH}$ 234 m$\mu$, E 141.

MIC: $E. \ coli$ >40 $\gamma$/cc., $St. \ aureus$ 0.5 $\gamma$/cc.

EXAMPLE 20

*7-[2-phenyl-2-(2-ethoxyethoxy) acetamido] cephalosporanic acid*

To 165 mg. of 2-phenyl-2-(2-ethoxyethoxy) acetic acid in 10 cc. of tetrahydrofuran was added 1 cc. of tetrahydrofuran solution containing 200 mg. of dicyclohexylcarbodiimide and stirred for 15 minutes at room temperature. To this solution was added drop by drop 10 cc. of the aqueous solution containing 250 mg. of 7-aminocephalosporanic acid and 75 mg. of sodium bicarbonate in a minute and, after stirring for 4 hours at room temperature, allowed to stand overnight. The reaction mixture was filtered and from the filtrate, tetrahydrofuran was distilled off under reduced pressure. The remainder from which an oily decomposed compound of dicyclohexylcarbodiimide was removed, was adjusted to pH 1.0 with 5% hydrochloric acid and extracted with 100 cc. of ethyl acetate. From the extract solution, ethyl acetate was distilled off under reduced pressure and the remainder was, after dissolving into acetone, filtered. From the filtrate, acetone was distilled off under reduced pressure and the remainder was washed with petroleum ether to obtain 100 mg. of 7-[2-phenyl-2-(2-ethoxyethoxy) acetamido] cephalosporanic acid as white powders having M.P. 33°–35° C. (dec.).

UV: $\lambda_{max.}^{80\% \; C_2H_5OH \cdot NaOH}$ 260 m$\mu$, E 101.

MIC: $E.\; coli$ >40 $\gamma$/cc., $St.\; aureus$ 2 $\gamma$/cc.

EXAMPLE 21

*7-(2-phenoxy-2-ethoxycarbonylacetamido) cephalosporanic acid*

To 403 mg. of 2-phenoxy-2-ethoxycarbonylacetic acid in 10 cc. of tetrahydrofuran was added 2 cc. of tetrahydrofuran solution containing 400 mg. of dicyclohexylcarbodiimide and stirred for 15 minutes at room temperature. To this solution was added 10 cc. of aqueous solution containing 500 mg. of 7-aminocephalosporanic acid and 150 mg. of sodium bicarbonate and after stirring for 3 hours, allowed to stand overnight. The reaction mixture was filtered and from the filtrate, tetrahydrofuran was distilled off under reduced pressure. The remainder from which an oily decomposed compound of dicyclohexylcarbodiimide was removed, was adjusted to pH 1.0 with 5% hydrochloric acid and extracted with 100 cc. of ethylacetate. From the extract solution, ethyl acetate was distilled off under reduced pressure and the remainder dissolved into acetone and then filtered. From the filtrate, acetone was distilled off under reduced pressure and the remainder was washed with the mixture of ether and petroleum ether to obtain 42 mg. of 7-(2-phenoxy-2-ethoxycarbonylacetamido) cephalosporanic acid as powders having M.P. 120°–128° C. (dec.).

UV: $\lambda_{max.}^{80\% \; C_2H_5OH \cdot NaOH}$ 267 m$\mu$, E 188.

MIC: $E.\; coli$ >40 $\gamma$/cc., $St.\; aureus$ 2 $\gamma$/cc.

EXAMPLE 22

*7-[2-phenyl-2-(phenylthio) acetamido] cephalosporanic acid*

To 490 mg. of 2-phenyl-2-(phenylthio) acetic acid dissolved in 15 cc. of tetrahydrofuran was 2 cc. of the tetrahydrofuran solution containing 214 mg. of dicyclohexylcarbodiimide and stirred for 30 minutes at room temperature. To this solution was added drop by drop 540 mg. of 7-aminocephalosporanic acid and 180 mg. of sodium bicarbonate in 5 cc. of water and 5 cc. of tetrahydrofuran in a minute and stirred for 6 hours at room temperature. The reaction mixture was filtered and from the filtrate, tetrahydrofuran was distilled off under reduced pressure. Thus obtained remaining solution was filtered and after adjusting to pH 2.0 with 5% hydrochloric acid, the filtrate was extracted with 100 cc. of ethyl acetate. From the extract solution, ethyl acetate was distilled off under reduced pressure and the remainder was washed with the mixture of ether and ligroin to obtain 40 mg. of 7-[2-phenyl-2-(phenylthio)- acetamido] cephalosporanic acid as powders having M.P. 114°–120° C. (dec.).

MIC: $E.\; coli$ >40 $\gamma$/cc., $St.\; aureus$ 1.25 $\gamma$/cc.

EXAMPLE 23

*7-[2,2-di(phenylthio) acetamido] cephalosporanic acid*

2,2-di(phenylthio) acetic acid (500 mg.) and 426 mg. of dicyclohexylcarbodiimide are dissolved into 10 cc. of tetrahydrofuran and stirred for 20 minutes at room temperature. To this solution was added 500 mg. of 7-aminocephalosporanic acid and 160 mg. of sodium bicarbonate in 10 cc. of tetrahydrofuran and 10 cc. of water and stirred for 5 hours at room temperature. To this solution was further added 1 cc. of dicyclohexylcarbodiimide solution and allowed to stand overnight. The reaction mixture was filtered and from the filtrate, tetrahydrofuran was distilled off under reduced pressure. The remaining solution was adjusted to pH 7.2 with sodium bicarbonate and then filtered. Thus obtained remainder was adjusted to pH 2.0 with hydrochloric acid and extracted with ethyl acetate. From the extract solution, ethyl acetate was distilled off and thus obtained remainder was washed with ether to obtain 93 mg. of 7-[2,2-di(phenylthio)acetamido] cephalosporanic acid as powders having M.P. 78°–85° C. (dec.).

UV: $\lambda_{max.}^{80\% \; C_2H_5OH \cdot NaOH}$ 260 m$\mu$, E 298.

MIC: $E.\; coli$ >40 $\gamma$/cc., $St.\; aureus$ 0.2 $\gamma$/cc.

EXAMPLE 24

*7-{2-phenyl-2-[o-methoxy-p-(2-propenyl) phenoxy] acetamido}cephalosporanic acid*

7-aminocephalosporanic acid (540 mg.) and 170 mg. of sodium bicarbonate were dissolved into 10 cc. of water and 10 cc. of tetrahydrofuran. To this solution was added 1185 mg. of 2-phenyl-2-[o-methoxy-p-(2-propenyl) phenoxy] acetic acid, dissolved into 15 cc. of tetrahydrofuran and 2 cc. of tetrahydrofuran solution of dicyclohexylcarbodiimide (0.2 g./cc.), and stirred for 3 hours at room temperature. The reaction mixture was filtered and the filtrate was condensed under reduced pressure, after which the condensed solution was further filtered. The filtrate obtained here was adjusted to pH 2 with hydrochloric acid and extracted with ether. The extract solution was condensed under reduced pressure and the remainder was dissolved into ether. The ether solution was condensed under reduced pressure and the condensed solution was filtered. The filtrate was further condensed to obtain 432 mg. of 7-{2-phenyl-2-[o-methoxy-p-(2-propenyl) phenoxy] acetamido}cephalosporanic acid as hygroscopic powders.

UV: $\lambda_{max.}^{80\% \; C_2H_5OH \cdot NaOH}$ 275 m$\mu$, E 153.

MIC: $E.\; coli$ >40 $\gamma$/cc., $St.\; aureus$ 1 $\gamma$/cc.

EXAMPLE 25

*DL-7-[2-phenyl-3-(p-methoxyphenyl)propionamido] cephalosporanic acid*

7-aminocephalosporanic acid (4.3 g.) was dissolved into 80 cc. of chloroform and 5 cc. of triethylamine and stirred under ice-cooling. To this solution was added drop by drop the chloroform solution containing 4.5 g. of DL-2-phenyl-3-(p-methoxyphenyl) propionyl chloride in 30 minutes and stirred under ice-cooling for an hour and then for 3 hours at room temperature. To the reaction mixture was added water and adjusted to pH 1.0 with 10% hydrochloric acid. The chloroform layer was washed with water and dried over magnesium sulfate, after which chloroform was distilled off under reduced pressure. The remainder was washed with ether and petroleum ether and thus obtained crude crystals (7.27 g.) was recrystallized from water and ethanol to obtain 3.87 g. of DL-7-[2-phenyl-3-(p-methoxyphenyl) propionamido] cephalosporanic acid as crystals having M.P. 104° C. (dec.).

Analysis.—Calculated for $C_{26}H_{28}O_7N_2S \cdot H_2O$: C, 59.08; H, 5.34; N, 5.30; S, 6.07. Found: C, 59.48; H, 55.59; N, 5.56; S, 6.25.

UV: $\lambda_{max.}^{80\% \; C_2H_5OH \cdot NaOH}$ 226 m$\mu$, E 371; 265, 176.

MIC: $E.\; coli$ >40 $\gamma$/cc., $St.\; aureus$ 2 $\gamma$/cc.

EXAMPLE 26

*7-(2-chloro-2-phenylacetamido)-3-pyridiniummethyl-decephalosporanic acid inner salt*

7-(2-chloro-2-phenylacetamido) cephalosporanic acid obtained in Example 1 (100 mg.) was dissolved into 2 cc. of pyridine and 3 cc. of water and allowed to stand for 30 hours at 37°–40° C. in the nitrogen gas current, while shaking 3 or 4 times. After the reaction was over, the reaction mixture was treated with 3 cc. of ethyl acetate twice and the water layer was condensed under reduced pressure. The residue dissolved into water was purified through the column packed with an anion exchange resin (Doewex-1). The eluate was solidified by freezing dry to obtain 15 mg. of 7-(2-chloro-2-phenylacetamido)-3-pyridiniummethyl-decephalosporanic acid inner salt.

Electrophoresis: −22 mm. (14 volt/cm., 3 hours).

EXAMPLE 27

*7-(2-bromo-2-phenylacetamido)-3-pyridiniummethyl-decephalosporanic acid inner salt*

7-amino-3-pyridiniummethyl-decephalosporanic acid inner salt and 2-bromo-2-phenylacetyl chloride in 50% acetone were treated in the presence of sodium bicarbonate in the same way as described in Example 2. The reaction mixture was treated with ether at pH 5.5–6.5 and the water layer was purified through the column packed with Doewex-1. The solution containing the object compound was condensed under reduced pressure and added to acetone to obtain the object compound.

Electrophoresis: −27 mm. (14 volt/cm., 3 hours).

EXAMPLE 28

*7-(2-phenyl-3-p-methoxyphenylpropionamido)-3-pyridiniummethyl-decephalosporanic acid inner salt*

7-amino-3-pyridiniummethyl-decephalosporanic acid inner salt and 2-phenyl-3-p-methoxyphenylpropionyl chloride were treated in the same way as described in Example 27. M.P. 180° C. (dec.).

UV: $\lambda_{max.}^{80\% \ C_2H_5OH}$ 260 m$\mu$, E 135.
MIC: *E. coli* >40 $\gamma$/cc., *St. aureus* 1 $\gamma$/cc.

EXAMPLE 29

*7-(2-phenyl-3-p-methoxyphenylpropionamido)-3-(1-imidazolinium) methyl-decephalosporanic acid inner salt*

7-amino-3-imidazolinum) methyl - decephalosporanic acid inner salt and 2-phenyl-3-p-methoxyphenylpropionyl chloride were treated in the same way as described in Example 27. M.P. 65°–70° C.

UV: $\lambda_{max.}^{H_2O}$ 276 m$\mu$, E 47.
MIC: *E. coli* >40 $\gamma$/cc., *St. aureus* 2.5 $\gamma$/cc.

EXAMPLE 30

*7-(2-phenyl-3-p-methoxyphenylpropionamido) - 3-[1-(2-methyl)imidazolinium] methyl-decephalosporanic acid inner salt*

7-amino-3-[1-(2-methyl) imidazolinium] methyl-decephalosporanic acid inner salt and 2-phenyl-3-p-methoxyphenylpropionyl chloride were treated in the same way as described in Example 27.

MIC: *E. coli* >40 $\gamma$/cc., *St. aureus* 2.5 $\gamma$/cc.

EXAMPLE 31

*7-(2 - phenyl-3-p-methoxyphenylpropionamido) - 3-[1-(2-amino) pyridinium] methyl-decephalosporanic acid inner salt*

7-amino-3-[1-(2-amino) pyridinium] methyl-decephalosporanic acid inner salt and 2-phenyl-3-p-methoxyphenylpropionyl chloride were treated in the same way as described in Example 27.

MIC: *E. coli* >40 $\gamma$/cc., *St. aureus* 4 $\gamma$/cc.

EXAMPLE 32

*Dicyclohexylamine salt of 7-(2-chloro-2-phenylacetamido) cephalosporanic acid*

To the aqueous solution of the substance obtained in Example 1 was added drop by drop the acetone solution of dicyclohexylamine at room temperature under vigorously stirring and allowed to stand in an ice-box to obtain dicyclohexylamine salt of 7-(2-chloro-2-phenylacetamido) cephalosporanic acid having M.P. 196°–200° C. which was recrystallized from alcohol and water.

EXAMPLE 33

*Dibenzylethylenediamine salt of 7-(2-chloro-2-phenylacetamido) cephalosporanic acid*

The substance obtained in Example 1 and dibenzylethylenediamine were treated in the same way as described in Example 32 to obtain dibenzylethylenediamine salt of 7-(2-chloro-2-phenylacetamido) cephalosporanic acid having M.P. 171°–174° C. (dec.).

UV: $\lambda_{max.}^{2\% \ HCON(CH_3)_2 \cdot H_2O}$ 257 m$\mu$, E 112.

EXAMPLE 34

*Sodium salt of 7-(2-chloro-2-phenylacetamido) cephalosporanic acid*

The substance obtained in Example 1 and sodium bicarbonate were treated in the same way as described in Example 32 to obtain sodium salt of 7-(2-chloro-2-phenylacetamido) cephalosporanic acid.

UV: $\lambda_{max.}^{H_2O}$ 260 m$\mu$, E 208.

EXAMPLE 35

*Dicyclohexylamine salt of 7-(2-bromo-2-phenylacetamido) cephalosporanic acid*

The substance obtained in Example 2 and dicyclohexylamine were treated in the same way as described in Example 32 to obtain dicyclohexylamine salt of 7-(2-bromo-2-phenylacetamido) cephalosporanic acid. M.P. 159°–165° C. (dec.).

UV: $\lambda_{inf.}^{20\% \ Tetrahydrofuran \cdot H_2O}$ 258–263 m$\mu$, E 158.

EXAMPLE 36

*Dibenzylethylenediamine salt of 7-(2-bromo-2-phenylacetamido) cephalosporanic acid*

The substance obtained in Example 2 and dibenzylethylenediamine were treated in the same way as described in Example 32 to obtain dibenzylethylenediamine salt of 7-(2-bromo-2-phenylacetamido) cephalosporanic acid M.P. 150°–153° C. (dec.).

UV: $\lambda_{max.}^{2\% \ HCON(CH_3)_2 \cdot H_2O}$ 257 m$\mu$, E 142.

EXAMPLE 37

*Sodium salt of 7-(2-bromo-2-phenylacetamido) cephalosporanic acid*

The substance obtained in Example 2 and sodium bicarbonate were treated in the same way as described in Example 32 to obtain sodium salt of 7-(2-bromo-2-phenylacetamido) cephalosporanic acid.

UV: End$_{min}$ (H$_2$O), $\lambda_{inf.}^{H_2O}$ 259–264 m$\mu$, E 191.

EXAMPLE 38

*7-(2-bromo-2-phenylacetamido)-3-pyridiniummethyl-decephalosporanic acid inner salt*

The substance obtained in Example 2 and pyridine were treated in the same way as described in Example 26 to obtain 7-(2-bromo - 2 - phenylacetamido)-3-pyridiniummethyl-decephalosporanic acid inner salt.

Electrophoresis: −27 mm. (14 volt/cm., 3 hours).

We claim:
1. A compound having the general formula

$$\begin{array}{c} R_2 \\ | \\ R_1\text{—CH—CO—NH—CH—CH} \\ | \\ \text{CO—N} \end{array} \begin{array}{c} S \\ \diagup \quad \diagdown \\ \quad CH_2 \\ | \\ C\text{—CH}_2R_3 \\ \diagdown \diagup \\ C \\ | \\ COOM \end{array}$$

wherein R$_1$ is azido or lower alkanoyloxy; R$_2$ is phenyl, halophenyl or nitrophenyl; R$_3$ is acetoxy, pyridinium, aminopyridinium, imidazolinium or methylimidazolinium;

and M is hydrogen, an alkali metal, dicyclohexylammonium or an anionic charge.

2. 7-[2-azido - 2 - phenylacetamido] cephalosporanic acid.

3. 7-[2-azido-2-(p-chlorophenyl) acetamido] cephalosporanic acid.

4. 7-[2-azido-2-(p - nitrophenyl) acetamido] cephalosporanic acid.

5. 7-(2-acetoxy - 2 - phenylacetamido) cephalosporanic acid.

References Cited

UNITED STATES PATENTS

| | | | |
|---|---|---|---|
| 3,225,038 | 12/1965 | Flynn | 260—243 |
| 3,236,841 | 2/1966 | Kuehl et al. | 250—243 |

NICHOLAS S. RIZZO, *Primary Examiner.*

UNITED STATES PATENT OFFICE
CERTIFICATE OF CORRECTION

Patent No. 3,338,897                                           August 29, 1967

Tadayoshi Takano et al.

It is hereby certified that error appears in the above numbered patent requiring correction and that the said Letters Patent should read as corrected below.

In the heading to the printed specification, lines 2 to 4, for "7-($\alpha$-SUBSTITUTED ACYL AMINO) CEPHALOSPORANIC ACID AND DERIVATIVES THEREOF" read -- 7-($\alpha$-SUBSTITUTED ACYLAMINO) CEPHALOSPORANIC ACID AND DERIVATIVES THEREOF --; column 1, line 26, for "alkyoxyaralkyl" read -- alkoxyaralkyl --; line 31, for "methylimidazolium" read -- methylimidazolinium --; column 2, line 39, for "dibenzylethylenediaminne" read -- dibenzylethylenediamine --; line 40, for "pryidinium" read --pyridinium --; column 8, line 28, for "amino-malonamido" read -- aminomalonamido --; line 39, for "acetoxy" read -- acetic --; line 41, for "20" read -- 220 --; column 10, line 55, for "H, 55.59" read -- H, 5.59 --; column 13, line 3, for "phenylacetamidol" read -- phenylacetamido --; column 14, line 6, for "250-243" read -- 260-243 --.

Signed and sealed this 17th day of September 1968.

(SEAL)
Attest:

EDWARD M.FLETCHER,JR.                      EDWARD J. BRENNER
Attesting Officer                              Commissioner of Patents